United States Patent [19]

Barron

[11] Patent Number: 6,005,888

[45] Date of Patent: Dec. 21, 1999

[54] METHOD FOR PROVIDING OFFSET MASK FOR PSEUDO-NOISE SEQUENCE GENERATOR

[75] Inventor: Kenneth S. Barron, Plano, Tex.

[73] Assignee: Texas Instruments Incorporated, Dallas, Tex.

[21] Appl. No.: 08/889,299

[22] Filed: Jul. 8, 1997

[51] Int. Cl.$^6$ ............... H04K 1/00; H04L 7/00; G06F 1/02

[52] U.S. Cl. ............... 375/208; 375/367; 364/717

[58] Field of Search ............... 375/200, 208, 375/209, 210, 206, 367; 370/320, 335, 441, 515; 341/173, 187; 364/717, 717.5

[56] References Cited

U.S. PATENT DOCUMENTS

| | | | |
|---|---|---|---|
| 5,228,054 | 7/1993 | Rueth et al. | 375/200 |
| 5,532,695 | 7/1996 | Park et al. | 375/200 |
| 5,835,528 | 11/1998 | Barron | 375/200 |

*Primary Examiner*—Stephen Chin
*Assistant Examiner*—Albert Park
*Attorney, Agent, or Firm*—J. Dennis Moore; Wade James Brady, III; Richard L. Donaldson

[57] ABSTRACT

A method, executed in a microprocessor, for providing a shift-and-add mask, $M = m_1, m_2, \ldots, m_{N-1}, m_N$, for a pseudo-noise sequence generator ("PNSG"). The PNSG generates a first pseudo-noise ("PN") code, and has N stages, each stage being at one of two states. The PNSG also has an associated shifter for generating a shifted PN code which is the same code as the first PN code, but delayed by K chips. The shifted PN code is generated as the inner product of the shift-and-add mask with the states of the stages of the PNSG. According to the inventive method, a value of K is provided, and it is determined whether K is 0. If K is 0, M is provided such that $m_N = 1$ and, for all $n \neq N$, $m_n = 0$. However, if K is not 0, it is determined whether K is greater than N. If K is greater than N, the remainder, R, of the division $D^{K-1}/f(D)$, is determined, where $$D^{K-1} = (m_1c_1 + m_2c_2 + \ldots + m_Nc_N) + (m_2c_1 + m_3c_2 + \ldots + m_Nc_{N-1})D + (m_3c_1 + m_4c_2 + \ldots + m_Nc_{N-2})D^2 + \ldots + m_Nc_1D^{N-1},$$

and $$f(D) = c_1D^N + c_2D^{N-1} + \ldots + c_ND + 1.$$

Then, M is determined by setting $$R = (m_1c_1 + m_2c_2 + \ldots + m_Nc_N) + (m_2c_1 + m_3c_2 + \ldots + m_Nc_{N-1})D + (m_3c_1 + m_4c_2 + \ldots + m_Nc_{N-2})D^2 + \ldots + m_Nc_1D^{N-1},$$

and determining the resulting values of $m_n$. However, if K is not greater than N, M is determined by setting $$D^{K-1} = (m_1c_1 + m_2c_2 + \ldots + m_Nc_N) + (m_2c_1 + m_3c_2 + \ldots + m_Nc_{N-1})D + (m_3c_1 + m_4c_2 + \ldots + m_Nc_{N-2})D^2 + \ldots + m_Nc_1D^{N-1},$$

and determining the resulting values of $m_n$.

6 Claims, 2 Drawing Sheets

METHOD FOR PROVIDING OFFSET MASK FOR PSEUDO-NOISE SEQUENCE GENERATOR

TECHNICAL FIELD OF THE INVENTION

This invention relates to pseudo-noise sequence generators, and more particularly relates to a method for quickly providing a shift-and-add offset mask for rapid pseudo-noise sequence phase offset from a reference sequence.

BACKGROUND OF THE INVENTION

Pseudo-noise ("PN") codes are finding increasing application, for example in the area of wireless telephony. In code division multiple access telephony, for example, a digitized data stream is encoded using PN codes, to "spread" the spectrum of the signal transmitting the data. The digitized data stream is decoded using the same PN code used to encode it at the transmitter.

By illustration, FIG. 1 shows a block diagram of a portion of a code division multiple access ("CDMA") receiver unit. Specifically, FIG. 1 shows the functional blocks of a CDMA digital baseband functional unit 10 useful in understanding an application of the present invention. The blocks are implemented primarily in software running on a digital signal processor ("DSP").

Thus, there is shown an Energy Estimator unit 18, a Searcher 20, and a plurality of "Fingers" 22, each of which receives the two-wide input line 12 as an input. The outputs of the Energy Estimator unit 18, Searcher 20 and "Fingers" 22, are provided to other functional units represented collectively by block 24, such as, for reception, rate detection, symbol alignment, Viterbi decoding, etc., and, for transmission, encoding, interleaving, etc. Voice signals are provided on line 14 to block 24. Signals from Estimator unit 18 are provided on line 26 to block 24. Signals from Searcher 20 are provided on line 28 to block 24. Signals from Fingers 22 are provided on lines 30 to block 24. A Transmit Processing unit 32 receives encoded data signals on line 34. The output of Transmit Processing unit 32 is provided on line 16.

A PN Code Generator unit 36 provides PN code signals on line 38 to Fingers 22, and on lines 40 to Transmit Processing unit 32. The PN Code Generator unit 36 receives control signals on lines 42 from block 24, and it receives clock signals from a Clock Generator 44 on lines 46. Clock Generator 44 also provides clock signals on lines 48 for various other clocked functions in Functional unit 10.

As a general matter, in operation, functional unit 10 receives I and Q encoded data streams on two-wide input lines 12, provided from an RF front end unit (not shown), and performs various functions associated with CDMA reception, such as signal acquisition, rate determination, Viterbi decoding, digital-to-analog conversion, and the like. The I,Q encoded data is provided in the form of binary encoded sample values of the analog RF signal received at the RF front end, since the implementation of the functional unit 10 is in a software process executed using a DSP, which requires such binary encoded sample form for the data.

Functional unit 10 also receives voice signals on line 14, performs various transmission functions, such as analog-to-digital conversion and encoding, and provides I,Q coded, spread-spectrum signals on two-wide output line 16 for modulation and transmission by the RF front end unit.

Specifically, the binary encoded sample values, of I,Q coded data, on line 12 are provided to Energy Estimator 18, which performs various operations on the data to estimate the average envelope strength of the received signal, and provides the result on line 26 for further processing. The binary encoded sample values, of I,Q coded data, on line 12 are also provided to Searcher 20, which performs various operations on the data to identify received signals for allocation to one of the Fingers 22, the data for such selection being provided to block 24 on line 28. Finally, the binary encoded sample values, of I,Q coded data, are provided on line 12 to Fingers 22 where some binary encoded values are selected and used in a decoding operation using a PN code provided on line 38 by PN Code Generator 36 to determine whether the PN Code Generator code signal is at the proper timing to decode the signal on line 12.

The PN Code Generator 36 also provides PN code signals, on lines 40, to the Transmit Processing Unit 32, which uses such PN code signals to spread-spectrum encode the digitized voice data, which may be Walsh encoded, e.g., provided on line 34 from block 24. The spread-spectrum signal resulting from this process is provided on output line 16. The PN Code Generator 36 also includes a Mask Generator subunit 37, which generates a mask for use in immediate shifts of the PN Code Generator 36 output, as is discussed in detail hereinbelow.

All of the foregoing, in general, is well known in the spread-spectrum communications art. Further details of the various functional units of such a CDMA digital baseband functional unit 10, other than that of the PN code generator 36, are, therefore, not pertinent to an understanding of the present invention, and so, in the interest of clarity and brevity are not described in detail herein. The PN code generator 36, however, is pertinent, and is described further hereinbelow.

First, turning to a general discussion of PN codes, PN codes are generated by pseudo-noise sequence generators ("PNSGs"). One familiar apparatus used in PNSGs is a device known as a linear feedback shift register ("LFSR"). However, PNSGs are not limited to LFSRs. An PNSG is typically composed of a series of N stages, each stage including a memory element or memory step (depending on whether the PNSG is hardware or software), whose inputs are a linear combination (modulo 2) of the output memory element or step and previous memory element or step when viewed from a left-to-right perspective. The individual ones and zeros ("bits") of the output sequence of a PNSG, i.e., of a PN code, are sometimes referred to as "chips." A specific example of a PNSG 1 for N=4 is shown in FIG. 2. It will be understood that the PNSG 1 may be implemented in hardware, for example as an LFSR, or it may be implemented in software, for example for execution on a DSP, in which case FIG. 2 represents a structure for the logical flow of the method so implemented. Discussion below assumes software implementation.

In FIG. 2 can be seen the four memory steps 50, 52, 54, 56, as well as an addition step 58 disposed between memory steps 54 and 56. The output of memory step 50 is provided to the input of memory step 52, the output of memory step 52 is provided to the input of memory step 54, while the output of memory step 54 is provided to one input of addition step 58. The output of addition step 58 is provided to the input of memory step 56, with the output of the PNSG being the output 60 of memory step 56. A feedback path 60' is also provided from the output 60 of memory step 56 to the input of memory step 50 and to the other input of addition step 58.

The operation of the PNSG 1 shown in FIG. 2 can be described by either a state diagram or a table. The "state" of the PNSG 1 is the value of the bits stored in the memory steps before a given iteration. Thus, for PNSG 1, the state before iteration "n" may be expressed as $S_n$=mnop, where m, n, o and p are the value of the bits stored in memory steps 50, 52, 54, 56, respectively. If the memory steps 50, 52, 54, 56, of PNSG 1 are initialized with the state $S_0$=0001, the output and subsequent states of the PNSG are as shown in Table 1:

TABLE 1

| Clock Cycle or Iteration | State | Output |
|---|---|---|
| 0 | 0001 | 1 |
| 1 | 1001 | 1 |
| 2 | 1101 | 1 |
| 3 | 1111 | 1 |
| 4 | 1110 | 0 |
| 5 | 0111 | 1 |
| 6 | 1010 | 0 |
| 7 | 0101 | 1 |
| 8 | 1011 | 1 |
| 9 | 1100 | 0 |
| 10 | 0110 | 0 |
| 11 | 0011 | 1 |
| 12 | 1000 | 0 |
| 13 | 0100 | 0 |
| 14 | 0010 | 0 |
| 15 | 0001 | 1 |

With respect to Table 1, note that after the 15th iteration the state of the PNSG reaches that of the initial or 0th iteration. In fact, the output and state sequences of the PNSG repeat with a period of 15. For the case of N=4, this represents the maximum possible period since the all zeros state never occurs. Thus, in general, a PNSG is capable of generating a sequence of period (or, length) $2^N-1$, where N is the number of stages. Not all PNSG configurations generate a sequence with the largest possible period, but those that do are said to generate a maximal length sequence or m-sequence for short. For the purposes of the present invention, PNSGs that generate m-sequences are of primary interest and hence discussion herein is focused on PNSGs having this property.

Now, it is often desirable to generate a delayed version of a PN code relative to some master, or reference, sequence. While it is possible to use a simple delay line to accomplish this, it is frequently necessary to generate very long delays that cause this approach to become impractical.

A superior technique for generating a delayed PN code exploits the shift-and-add property of m-sequences. This property means that when a shifted or delayed version of a PN code is added to itself, the resulting code is merely a delayed version of the original. To better understand this, consider the following sequence generated by the PNSG 1 of FIG. 2:
... 111101011001000 ....
If this sequence is shifted or delayed by one chip, the result is
... 011110101100100 ....
Adding these two sequences together using modulo 2 arithmetic yields
... 100011110101100 ... ,
which is merely the original PN sequence delayed by 4 chips. While other specific delays can be generated in this fashion, a more efficient and sophisticated method is described next.

Referring to the State column in Table 1, notice that the sequence associated with a particular stage represents a delayed version of the PNSG output. E.g., the sequence corresponding to the least significant bit of the state vector is identical to the output; the sequence corresponding to the most significant bit is the output delayed by one chip, etc. Thus according to the shift-and add property of m-sequences, another PN code having a specific delay relative to the original sequence can be generated by adding together one or more outputs of the four stages.

FIG. 3 shows a PN sequence generator having a PNSG 1, similar to the arrangement of FIG. 2, but also having an associated PN shifter 62. As in FIG. 1, four memory steps 50, 52, 54, 56, an addition step 58, an output 60 and a feedback path 60' are provided, interconnected as in FIG. 2. Also provided, however, is shifter 62. The shifter 62 is comprised of an additional four memory steps 64, 66, 68, and 70. These receive a PN shift-and-add mask value over an input 72. The output of memory step 64 is provided to one input of a first multiplier 74. The other input of multiplier 74 is the output of memory step 50. The output of memory step 66 is provided to one input of a second multiplier 76. The other input of multiplier 76 is the output of memory step 52. The output of memory step 68 is provided to one input of a third multiplier 78. The other input of multiplier 78 is the output of memory step 54. The output of memory step 70 is provided to one input of a fourth multiplier 80. The other input of multiplier 80 is the output of memory step 56.

The output of multiplier 74 is provided to one input of a second addition step 82. The output of multiplier 76 is provided to the second input of addition step 82, while the output of addition step 82 is provided to one input of a third addition step 84. The output of multiplier 78 is provided to the second input of addition step 84, while the output of addition step 84 is provided to one input of a fourth addition step 86. The output of multiplier 80 is provided to the second input of addition step 86. The output 88 of addition step 86 provides the same sequence as the output 60 of the PNSG 1, but delayed by an amount determined by the value of the shift-and-add mask stored in memory steps 64, 66, 68, and 70.

Thus, by forming the inner product of a shift-and-add mask, hereinafter simply referred to as a "mask," stored in the memory steps 64, 66, 68, 70, with the states of the PNSG, stored in the memory steps 50, 52, 54, 56, as shown in FIG. 2, a second sequence can be generated with a known delay relative to the PNSG output. This second sequence is, as mentioned above, provided at the output 88 of addition step 86.

However, a problem that exists in the practical application of the use of a mask for accomplishing rapid shifts of PN sequences is in the time it takes to generate the mask itself. For example, PN sequence generators are currently being used in code division multiple access ("CDMA") cellular telephone applications. Data rates in such applications are high. Rapid shifts in the PN sequences generated in such applications must also be rapid. Therefore, there is a need for a method and apparatus for generating a mask rapidly, yet controllably and accurately.

SUMMARY OF THE INVENTION

The present invention provides a method and apparatus for generating a pseudo-noise generator mask rapidly, yet controllably and accurately. In accordance with the present invention a method is executed, in circuitry or in a microprocessor, for providing a shift-and-add mask, M=$m_1$, $m_2$, ..., $m_{N-1}$, $m_N$, for a pseudo-noise sequence generator ("PNSG"). The PNSG generates a first pseudo-noise ("PN") code, and has N stages, each stage being at one of two states, and a feedback loop from the output of the PNSG. The value on the feedback loop is stored in each stage 1, 2, 3, ... N, after being multiplied by a constant associated with the stage, $c_1, c_2, c_3, \ldots c_N$, respectively, and the result added to the value in the previous stage, with "0" being deemed to be the value in the stage previous to the first stage, and then stored in the stage. The PNSG also has an associated shifter for generating a shifted PN code which is the same code as the first PN code, but delayed by K chips. The shifted PN code is generated as the inner product of the shift-and-add mask with the states of the stages of the PNSG. According to the inventive method, a value of K is provided, and it is determined whether K is 0. If K is 0, M is provided such that $m_N=1$ and, for all $n \neq N$, $m_n=0$. However, if K is not 0, it is determined whether K is greater than N. If K is greater than N, the remainder, R, of the division $D^{K-1}/f(D)$, is determined, where $$D^{K-1}=(m_1c_1+m_2c_2+\ldots+m_Nc_N)+(m_2c_1+m_3c_2+\ldots+m_Nc_{N-1})D+(m_3c_1+m_4c_2+\ldots+m_Nc_{N-2})D^2+\ldots+m_Nc_1D^{N-1},$$

and $$f(D)=c_1D^N+c_2D^{N-1}+\ldots+c_ND+1.$$

Then, M is determined by setting $$R=(m_1c_1+m_2c_2+\ldots+m_Nc_N)+(m_2c_1+m_3c_2+\ldots+m_Nc_{N-1})D+(m_3c_1+m_4c_2+\ldots+m_Nc_{N-2})D^2+\ldots+m_Nc_1D^{N-1},$$

and determining the resulting values of $m_n$. However, if K is not greater than N. M is determined by setting $$D^{K-1}=(m_1c_1+m_2c_2+\ldots+m_Nc_N)+(m_2c_1+m_3c_2+\ldots+m_Nc_{N-1})D+(m_3c_1+m_4c_2+\ldots+m_Nc_{N-2})D^2+\ldots+m_Nc_1D^{N-1},$$

and determining the resulting values of $m_n$.

These and other features of the invention that will be apparent to those skilled in the art from the following detailed description of the invention, taken together with the accompanying drawings.

DETAILED DESCRIPTION OF THE PREFERRED EMBODIMENT

Figure 4:
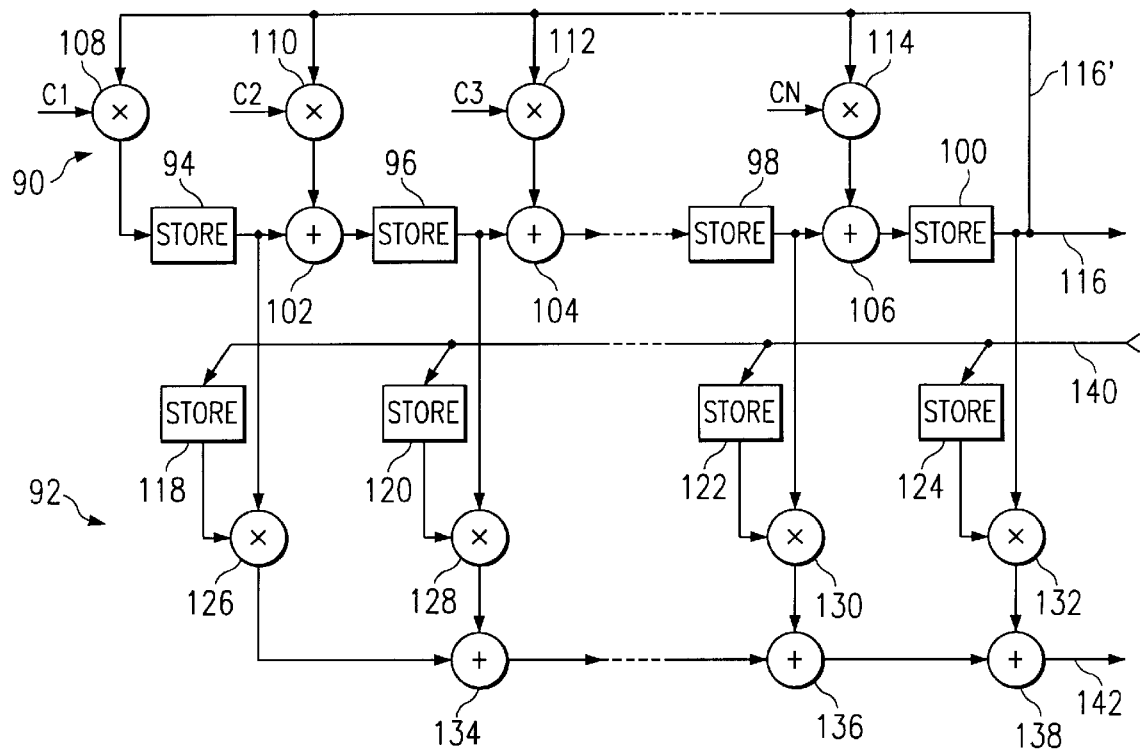
FIG. 4 is a generalized pseudo-noise sequence generator with associated shifter.

FIG. 4 shows a generalized PNSG 90 with an associated shifter 92, with which the preferred embodiment of the present invention may be used. Of course, the preferred embodiment may be used with more specific instances of the arrangement shown in FIG. 4, with appropriate modifications to the application of the preferred embodiment based on the particular parameters of such specific instance.

The PNSG 90 includes memory steps 94, 96, ..., 98, 100, for storing PN values $x_1, x_2, \ldots, x_{N-1}, x_N$, respectively. Also provided are addition steps 102, 104, ..., 106, and multipliers 108, 110, 112, ..., 114, as shown. The output of multiplier 108 is provided to the input of memory step 94. The output of memory step 94 is provided to one input of addition step 102, while the output of multiplier 110 is provided to the second input of addition step 102. The output of addition step 102 is provided to the input of memory step 96. The output of memory step 96 is provided to one input of addition step 104, while the output of multiplier 112 is provided to the other input of addition step 104, and so on, as shown, with the output end of PNSG 90 being interconnected such that the output of memory step 98 (having received as input the output of the previous stage's addition step) is provided to one input of addition step 106, while the output of multiplier 114 is provided to the second input of addition step 106. The output of addition step 106 is provided to the input of memory step 100. The output of memory step 100 is the output of the PNSG 90, which is the reference PN sequence output.

Constant $c_1$ is provided to one input of multiplier 108. Constant $c_2$ is provided to one input of multiplier 110. Constant $c_3$ is provided to one input of multiplier 112, and so on, as shown, while constant $c_N$ is provided to one input of multiplier 114. The output 116 of memory step 100 is provided to the other input to each of multipliers 108, 110, 112, ..., 114, via feedback path 116'. The output 116 of memory step 100 is also the output of the PNSG 90.

The shifter 92 is comprised of memory steps 118, 120, ..., 122, 124, for storing mask values $m_1, m_2, \ldots, m_{N-1}, m_N$, respectively. Also provided are multipliers 126, 128, ..., 130, 132, and addition steps 134, ..., 136, 138.

Memory steps 118, 120, ..., 122, 124, receive mask values $m_1, m_2, \ldots, m_{N-1}, m_N$, respectively, over line 140. The output of memory step 118 is provided to one input of multiplier 126. The output of memory step 94 is provided to the other input of multiplier 126, while the output of multiplier 126 is provided to one input of addition step 134. The output of memory step 120 is provided to one input of multiplier 128. The output of memory step 96 is provided to the other input of multiplier 128, while the output of multiplier 128 is provided to the other input of addition step 134, and so on, as shown, with the output end of shifter 92 being interconnected such that the output of memory step 122 is provided to one input of multiplier 130, with the output of memory step 98 being provided to the other input of multiplier 130, while the output of multiplier 130 is provided to one input of addition step 136. The other input of addition step 136 is provided from the previous stage's addition step. The output of addition step 136 is provided to one input of addition step 138. The output of memory step 124 is provided to one input of multiplier 132. The output of memory step 100 is provided to the other input of multiplier 132, while the output of multiplier 132 is provided to the other input of addition step 138. The output 142 of shifter 92 provides the same sequence as the output 116 of the PNSG 90, but delayed by an amount determined by the value of the shift-and-add mask stored in memory steps 118, 120, ..., 122, and 124.

It will now be shown, in accordance with the preferred embodiment of the present invention, how to provide rapidly a mask $m_1, m_2, \ldots, m_{N-1}, m_N$, for memory steps 118, 120, ..., 122, 124, to provide rapidly a PN sequence on output 142, shifted by a desired amount as compared with the PN sequence provided on output 116. Significant derivations involved in arriving at an equation (Equation 6, below) used in the provision of the mask are shown, for the benefit of providing deeper insight into the inventive principles, for those applying the principles set forth herein.

For the general PNSG 90 and shifter 92 shown in FIG. 4, I express the state outputs as a function of the PNSG output, $y(n)=x_N(n)$, and connection taps $(c_1, c_2, \ldots c_N)$:

$$x_1(n) = c_1 y(n-1) \quad (1)$$
$$x_2(n) = c_2 y(n-1) + x_1(n-1)$$
$$\vdots$$
$$x_N(n) = c_N y(n-1) + x_{N-1}(n-1)$$

I express the delayed output, $y(n-K)$, as:

$$y(n-K) = m_1 x_1(n) + m_2 x_2(n) + \ldots + m_n x_n(n) = \sum_{i=1}^{N} m_i x_i(n) \quad (2)$$

In Equation (2), K is the desired delay value, expressed as a number of chips. Eliminating $x_{n-1}(n)$ from $x_n(n)$, $n=2, \ldots, N$, in Equation (1) and inserting the result in Equation (2) yields:

$$y(n-K)=m_1 c_1 y(n-1)+m_2[c_2 y(n-1)+c_1 y(n-2)]+ \ldots +m_n[c_N y(n-1)+c_{N-1} y(n-2)+ \ldots +c_1 y(n-N)] \quad (3)$$

Defining the Delay Transform of $y(n-K)$ to be:

$$\Delta\{y(n-K)\}=D^k Y(D)$$

for any K, and applying this transformation to Equation (3) results in:

$$D^K Y(D)=m_1 c_1 DY(D)+m_2[c_2 DY(D)+c_1 D^2 Y(D)]+ \ldots m_N[c_N DY(D)+c_{N-1} D^2 Y(D)+ \ldots +c_1 D^N Y(D)] \quad (4)$$

Now, I divide both sides by $Y(D)$ and group terms according to powers of D, which leads to:

$$D^K=(m_1 c_1+m_2 c_2+ \ldots +m_N c_N)D+(m_2 c_1+m_3 c_2+ \ldots +m_N c_{N-1})D^2+(m_3 c_1+m_4 c_2+ \ldots +m_N c_{N-2})D^3+ \ldots +m_N c_1 D^N \quad (5)$$

Finally, I divide both sides of Equation (5) by D, to provide the following algorithm used in the preferred embodiment, as discussed in more detail below:

$$D^{K-1}=(m_1 c_1+m_2 c_2+ \ldots +m_N c_N)+(m_2 c_1+m_3 c_2+ \ldots +m_N c_{N-1})D+(m_3 c_1+m_4 c_2+ \ldots +m_N c_{N-2})D^2+ \ldots +m_N c_1 D^{N-1} \quad (6)$$

Since the feedback taps $c_n$, $n=1, 2, \ldots, N$, are known, it is now a straightforward matter to determine all of the PN mask bit values, $m_n$, $n=1, 2, \ldots, N$, starting with the last term in Equation (6). This is so because the value of K, which is a provided value, being the measure of the desired delay, expressed in number of chips, determines the power of the D term on the left. Having thus determined the power of D, it is then only necessary to find the parenthetical expression on the right hand side of Equation (6) with a D term having the same power of D on the left hand side of Equation (6), and solve that parenthetical expression for unity. All other terms on the right hand side of Equation (6) must amount to zero, and so drop out of consideration.

Figure 3:
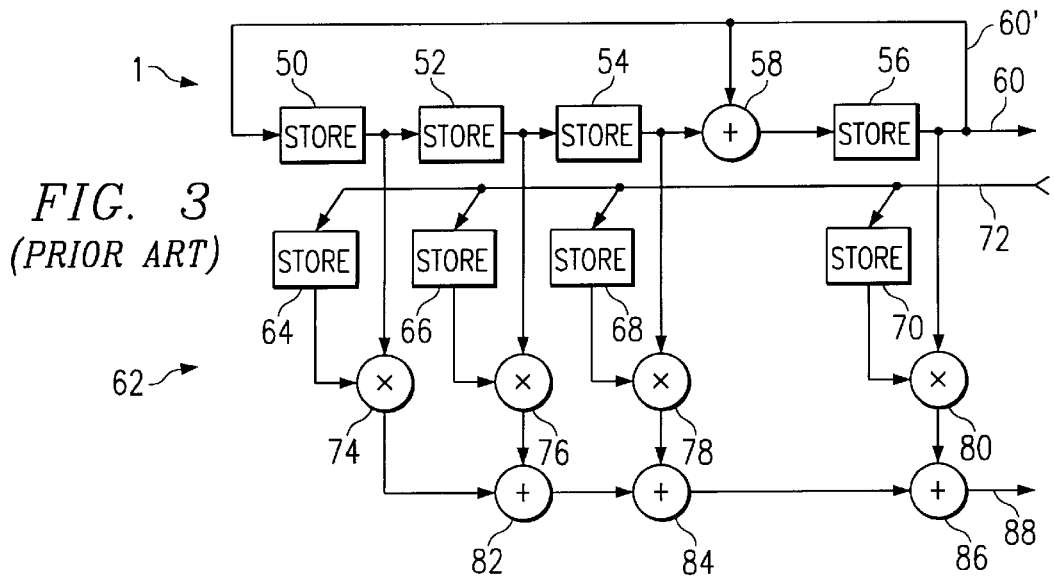
FIG. 3 is a prior art pseudo-noise sequence generator having an associated shifter.

The trivial case for Equation (6) occurs when the desired delay is zero (K=0). For this case, $m_N=1$ and $m_n=0$, $n=1, 2, \ldots, N-1$, which is clearly evident from an inspection of FIG. 3.

Referring now to Equation (6), it will be appreciated that a problem arises when the desired delay exceeds the number of stages, i.e., K>N. For this case, I reduce the factor $D^{K-1}$ by long division (modulo two) before using Equation (6). When K>N, a long division operation is performed, that involves dividing $D^{K-1}$ by a polynomial, $f(D)$, determined by the coefficients $C_n$, $n=1, 2, \ldots, N$:

$$f(D)=c_1 D^N+c_2 D^{N-1}+ \ldots +c_N D+1 \quad (7)$$

The remainder is then equated to the right hand side of Equation (6). Once the remainder has been found, the procedure for finding the mask bit values proceeds the same as when K<N.

Figure 1:
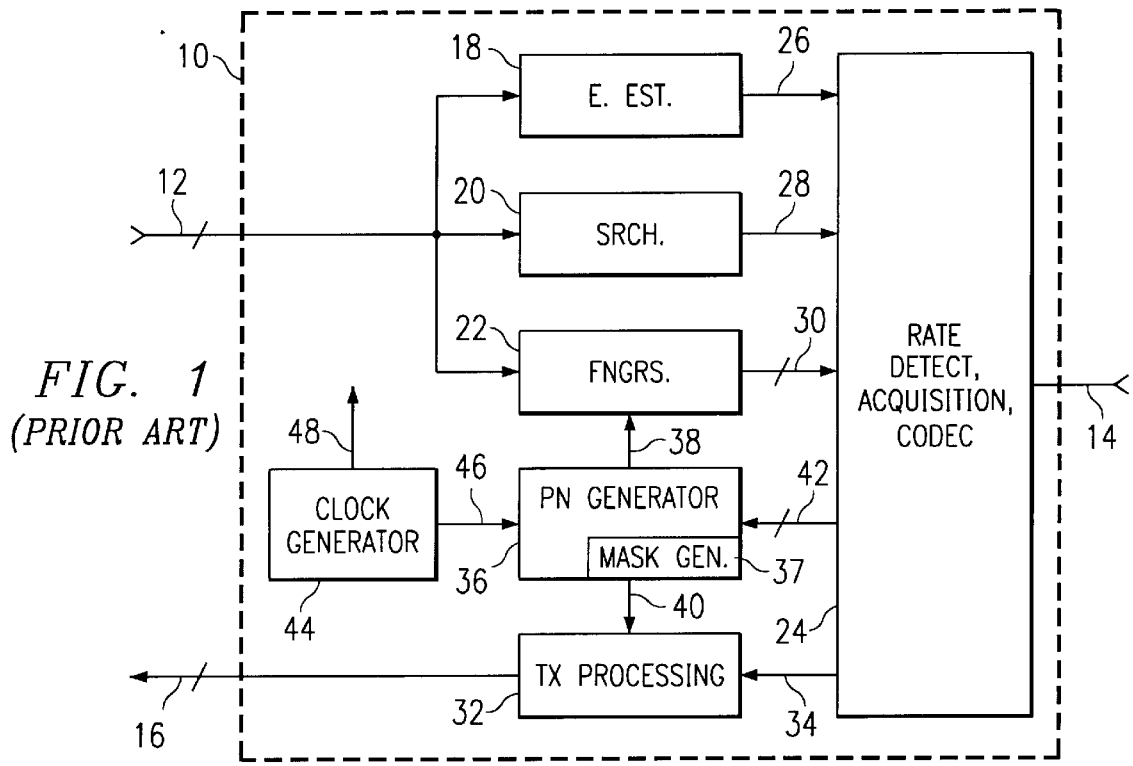
FIG. 1 is a block diagram of a CDMA digital baseband functional unit.
Figure 2:
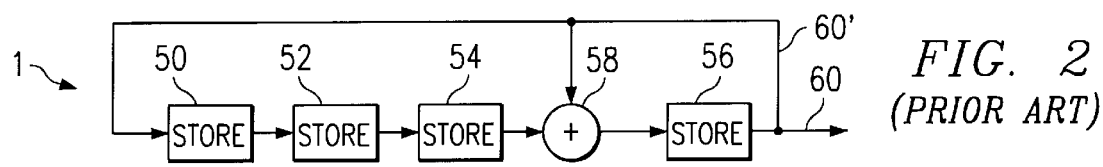
FIG. 2 is a block diagram of a prior art pseudo-noise sequence generator for pseudo-noise code sequence generation.

Applying the above teachings, the following method may be used, e.g., in the Mask Generator subunit 37 (FIG. 1), to generate a mask to further generate a secondary PN sequence with a delay of K chips, e.g., in the PN Generator 36 (FIG. 1):

(1) If the desired delay is zero chips (i.e., the same as the reference PN code), set $m_N=1$ and $m_n=0$, $n=1, 2, \ldots, N-1$, where N is the number of stages in the PNSG.

(2) If $K \leq N$, equate the factor $D^{K-1}$ to the right hand side of Equation (6) and solve for $m_n$, $n=1, 2, \ldots, N$, beginning with the last term in Equation (6).

(3) If K>N, determine the remainder of $D^{K-1}/f(D)$, equate to the right hand side of Equation (6), and solve for the mask bit values as in step two. Note that the long division step must be carried out modulo two.

Figure 5:
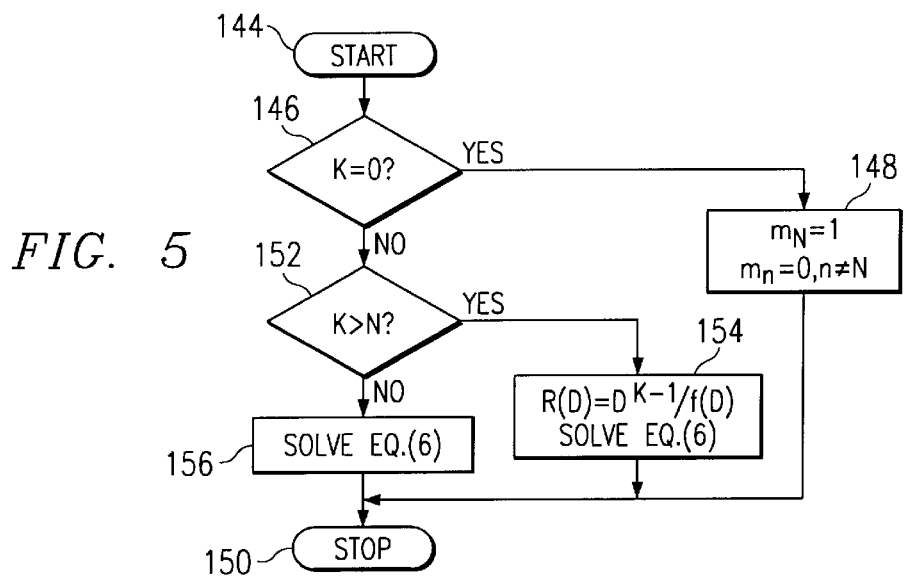
FIG. 5 is a flow chart showing the method for generation of a pseudo-noise mask according to the preferred embodiment of the present invention.

A flow chart illustrating the method described above is shown in FIG. 5. The method starts 144 and it is determined, 146, whether the desired delay, K, is 0 chips. If so, 148, $m_N$ is set to 1, and $m_n$ is set to 0 for all $n \neq N$, and the method stops 150. On the other hand, if it is determined that K is not 0 chips, then it is determined, 152, whether K is greater than N. It will be recalled that N is the number of stages in the PNSG generating the sequence. If K is greater than N, the remainder, $R(D)$, of the division $D^{K-1}/f(D)$ is determined. $R(D)$ is equated to the right hand side of Equation (6), which is solved for $m_n$, $n=1, 2, \ldots, N$, beginning with the last term in Equation (6) 154, and the method stops 150. On the other hand, if it is determined that K is not greater than N, then the factor $D^{K-1}$ is simply equated to the right hand side of Equation (6), which is likewise solved for $m_n$, $n=1, 2, \ldots, N$, beginning with the last term in Equation (6) 156, and the method stops 150.

An example of a mask calculation using the method of the preferred embodiment of the present invention will now be described. For the example PN code generator shown in FIG. 3, suppose it is desired to generate a secondary sequence having a delay of K=10 chips relative to the original sequence. Since N=4 and K>N, it is necessary to compute the remainder of $D^{K-1}/f(D)=D^9/(D^4+D+1)$ and equate the result to the right hand side of Equation (6). Carrying out the indicated operation modulo 2, the remainder is found to be $$R(D)=D^3+D.$$

The equation to be solved is then $$D^3+D=(m_1+m_4)D^0+m_2 D^1+m_3 D^2+m_4 D^3$$

which yields $m_4=1$, $m_3=0$, $m_2=1$, and $m_1=1$. Use of the mask M=1011 will result in a secondary sequence being generated at the delayed output in FIG. 3 that has a delay of K=10 chips with respect to the reference.

The method just described is advantageously implemented in software. Given the need for multiplications, implementation in software for execution on a digital signal processor is considered preferred. Specific coding of the steps of the method disclosed hereinabove will vary, depending on the microprocessor on which the code is to execute. However, such encoding is well within the purview of those of ordinary skill in the art area to which the present invention pertains, once the principles of the present invention, as set forth herein, are understood.

Although the present invention and its advantages have been described in detail, it should be understood that various changes, substitutions and alterations can be made herein without departing from the spirit and scope of the invention as defined by the appended claims. For example, although the method is described above as implemented in software, those of ordinary skill in this art will readily appreciate that implementation could be accomplished in hardware, as well.

What is claimed is:

1. A method performed in electronic circuitry for providing a shift-and-add mask, $M=m_1, m_2, \ldots, m_{N-1}, m_N$, for a pseudo-noise sequence generator ("PNSG"), the PNSG generating a first pseudo-noise ("PN") code, having N stages, each stage being at one of two states, and having a feedback loop from the output of the PNSG, the value on the feedback loop being stored in each stage 1, 2, 3, ... N, after being multiplied by a constant associated with the stage, $c_1, c_2, c_3, \ldots c_N$, respectively, and the result added to the value in the previous stage, with "0" being deemed to be the value in the stage previous to the first stage, and then stored in the stage, and the PNSG having an associated shifter for generating a shifted PN code which is the same code as the first PN code, but delayed by K chips, wherein the shifted PN code is generated as the inner product of the shift-and-add mask with the states of the stages of the PNSG, comprising the steps of:

storing a value of K;

determining whether K is 0, and if K is 0, determining and storing a value of M such that $m_N=1$ and, for all $n \neq N$, $m_n=0$; but if K is not 0, determining whether K is greater than N, and if K is greater than N, determining the remainder, R, of the division $D^{K-1}/f(D)$, and storing R, where $$D^{K-1}=(m_1c_1+m_2c_2+ \ldots +m_Nc_N)+(m_2c_1+m_3c_2+ \ldots +m_Nc_{N-1})D+ (m_3c_1+m_4c_2+ \ldots +m_Nc_{N-2})D^2+ \ldots +m_Nc_1D^{N-1},$$

and $$f(D)=c_1D^N+c_2D^{N-1}+ \ldots +c_ND+1,$$

and determining and storing a value of M by using a value of $$R=(m_1c_1+m_2c_2+ \ldots +m_Nc_N)+(m_2c_1+m_3c_2+ \ldots +m_Nc_{N-1})D+ (m_3c_1+m_4c_2+ \ldots +m_Nc_{N-2})D^2+ \ldots +m_Nc_1D^{N-1},$$

and to determine the resulting values of $m_n$; but
if K is not greater than N, determining and storing a value of M by setting $$D^{K-1}=(m_1c_1+m_2c_2+ \ldots +m_Nc_N)+(m_2c_1+m_3c_2+ \ldots +m_Nc_{N-1})D+ (m_3c_1+m_4c_2+ \ldots +m_Nc_{N-2})D^2+ \ldots +m_Nc_1D^{N-1},$$

and determining the resulting values of $m_n$; and using the PN code determined by the values $m_n$ to decode a received encoded signal.

2. A method according to claim 1, wherein said method is practiced substantially by execution of the steps in a microprocessor.

3. A method according to claim 1, wherein said method further comprises the steps of:

providing a shifter for generating a shifted PN code;

storing said mask, M, in said shifter; and generating said shifted PN code.

4. A method according to claim 1, wherein said method is practiced by execution of said steps in hardware.

5. A code division multiple access telephony receiver, comprising:

receiving means for receiving encoded data and generating analog signals therefrom, including a pseudo-noise decoder that receives a pseudo-noise code and uses it to decode the encoded data; and a pseudo-noise sequence generator ("PNSG"), the PNSG generating a first pseudo-noise ("PN") code, having N stages, each stage being at one of two states, and having a feedback loop from the output of the PNSG, the value on the feedback loop being stored in each stage 1, 2, 3, ... N, after being multiplied by a constant associated with the stage, $c_1, c_2, c_3, \ldots c_N$, respectively, and the result added to the value in the previous stage, with "0" being deemed to be the value in the stage previous to the first stage, and then stored in the stage, and the PNSG having an associated shifter for generating a shifted PN code which is the same code as the first PN code, but delayed by K chips, wherein the shifted PN code is generated as the inner product of the shift-and-add mask with the states of the stages of the PNSG, and means for providing a shift-and-add mask, $M=m_1, m_2, \ldots, m_{N-1}, m_N$, for said PNSG, comprising means for providing a value of K;

means for determining whether K is 0, and if K is 0, providing M such that $m_N=1$ and, for all $n \neq N$, $m_n=0$; but if K is not 0, determining whether K is greater than N, and if K is greater than N, determining the remainder, R, of the division $D^{K-1}/f(D)$, where $$D^{K-1}=(m_1c_1+m_2c_2+ \ldots +m_Nc_N)+(m_2c_1+m_3c_2+ \ldots +m_Nc_{N-1})D+ (m_3c_1+m_4c_2+ \ldots +m_Nc_{N-2})D^2+ \ldots +m_Nc_1D^{N-1},$$

and $$f(D)=c_1D^N+c_2D^{N-1}+ \ldots +c_ND+1,$$

and means for determining M by setting $$R=(m_1c_1+m_2c_2+ \ldots +m_Nc_N)+(m_2c_1+m_3c_2+ \ldots +m_Nc_{N-1})D+ (m_3c_1+m_4c_2+ \ldots +m_Nc_{N-2})D^2+ \ldots +m_Nc_1D^{N-1},$$

and determining the resulting values of $m_n$; but
if K is not greater than N, determining M by setting $$D^{K-1}=(m_1c_1+m_2c_2+\ldots+m_Nc_N)+(m_2c_1+m_3c_2+\ldots+m_Nc_{N-1})D+$$
$$(m_3c_1+m_4c_2+\ldots+m_Nc_{N-2})D^2+\ldots+m_Nc_1D^{N-1},$$

and determining the resulting values of $m_n$.

6. A code division multiple access telephony receiver according to claim 5, further comprising transmitting means for receiving analog signals and generating encoded data therefrom, including a pseudo-noise encoder that receives a pseudo-noise code and uses it to encode unencoded data derived from said analog signals.

\* \* \* \* \*